US005598223A

United States Patent [19]

[11] Patent Number: 5,598,223
[45] Date of Patent: Jan. 28, 1997

Leroux et al.

[54] METHOD FOR TRANSFORMING A VIDEO IMAGE INTO AN IMAGE SUITABLE FOR A DISPLAY MATRIX

[75] Inventors: Thierry Leroux, IFS; Christian Massart, Clichy-Sous-Bois, both of France

[73] Assignee: Essilor International, Charenton le Pont, France

[21] Appl. No.: 434,488

[22] Filed: May 4, 1995

[30] Foreign Application Priority Data

May 10, 1994 [FR] France .................................. 94 05728

[51] Int. Cl.$^{6}$ ................................ H04N 9/74; H04N 7/18

[52] U.S. Cl. ............................ 348/589; 348/95; 345/113; 451/5

[58] Field of Search .................................... 348/790–793, 348/761, 766, 448, 447, 441, 588, 589, 61, 86, 95; 345/154, 113, 50, 51; 451/5, 6, 390; 364/474.01, 474.06; H04N 9/30

[56] References Cited

U.S. PATENT DOCUMENTS

| | | | |
|---|---|---|---|
| 4,656,590 | 4/1987 | Ace | 364/474.06 |
| 4,680,632 | 7/1987 | Willis et al. | 348/447 |
| 4,730,260 | 3/1988 | Mori et al. | 364/518 |
| 4,885,787 | 12/1989 | Okamoto et al. | 382/54 |
| 4,908,710 | 3/1990 | Wakai et al. | 358/236 |
| 4,994,912 | 2/1991 | Lumelsky et al. | 358/140 |
| 5,168,270 | 12/1992 | Masumori et al. | 348/790 |
| 5,218,274 | 6/1993 | Zenda | 315/366 |
| 5,227,882 | 7/1993 | Kato | 358/160 |
| 5,283,980 | 2/1994 | Lohrenz et al. | 451/5 |
| 5,293,540 | 3/1994 | Trani et al. | 348/584 |

FOREIGN PATENT DOCUMENTS

| | | |
|---|---|---|
| 0539033 | 4/1993 | European Pat. Off. . |
| 2660471 | 10/1991 | France . |

*Primary Examiner*—Michael Lee
*Attorney, Agent, or Firm*—Pennie & Edmonds

[57] ABSTRACT

A method and device for transforming a video signal representing a video image into a signal representing an image for a display matrix useful in equipment for centering spectacle lenses are disclosed, the device comprising a unit supplying a video image of the lenses, a unit furnishing data for a spectacle frame, a microprocessor which generates an image of said frame and an alignment pattern for superimposition in the image of said lenses, and a flat panel display device.

6 Claims, 4 Drawing Sheets

METHOD FOR TRANSFORMING A VIDEO IMAGE INTO AN IMAGE SUITABLE FOR A DISPLAY MATRIX

BACKGROUND OF THE INVENTION

This invention relates to a method for transforming a video image into an image for a display matrix. The method applies particularly to the transformation of an image supplied by a monochrome CCD (charge coupled device) camera into an image for a LCD (liquid crystal display) type display matrix The invention also relates to a device for carrying out the method. The invention is particularly useful in devices for centering glass objects such as spectacle lenses.

In the remainder of this specification and claims, the expression "image" should be taken to mean both a real image, i.e. the real physically visible representation, as well as signals corresponding thereto and enabling said image to be represented on a cathode ray type tube (CRT tube) or display matrix.

One known type of CCD camera enables a standardized CCIR format image to be readily obtained: it is simple to use and has a compact structure. However, the image supplied can only be used on a cathode ray tube-type display device. This is a disadvantage as this type of screen, even though it ensures good image quality, takes up more space than a flat panel display, and maintaining the same image leads to a phenomenon of remanence. When used for measurement purposes, it also has disadvantages linked to the stability of the image over time and to problems of parallax due to the thickness of the glass of the screen and to its curved shape.

An LCD type display provides a simple solution to these problems: it takes up less space, is not subject to remanence if an image is maintained for a long time on the screen, it does not present problems with parallax or with the image drifting with the passage of time.

Despite this, no system exists allowing the image supplied by a CCD camera to be displayed on an LCD display.

This problem arises particularly in the field of optics. Opticians need to accurately situate spectacle glasses and lenses with respect to holders designed to receive them. Machines exist which enable the image of a lens to be viewed on a cathode ray screen at the same time as the image of its holder and, for example, of its frame. Such machines operate with a CCD type camera which films the image that the lens projects onto an opaque screen under the illumination supplied by the light from a light emitting diode. The image filmed by the CCD camera is projected onto a cathode ray screen, the image of the corresponding frame being projected at the same time.

This system could be further improved by using a flat LCD type display in place of the cathode ray tube.

SUMMARY OF THE INVENTION

One of the aims of the invention is thus to provide a device able to receive as an input the image supplied by a CCD camera and to supply an image suitable for an LCD display at its output.

The only devices known in the relevant technical field are graphic controllers for LCD display matrices, which enable a VGA (video graphics analyser) format image or an image in a different format, for example a non-VGA, non-interlaced and asynchronous image to be displayed on such a matrix. Such circuits are not suitable for receiving a CCIR or EIA (Electronic Industries Association) format image such as supplied by a CCD camera, at their input.

The present invention proposes a solution to this problem, and enables the advantages of a monochrome CCD-type camera and an LCD-type display matrix to be combined.

The invention provides method for transforming a video signal representing a video image into a signal representing an image for a display matrix comprising the steps consisting of:

- separating out field and line synchronization information for said video signal from useful even-numbered and odd-numbered field information;
- converting said useful information into digital signals corresponding to even-numbered and odd-numbered fields;
- writing digital signals corresponding to even-numbered fields into an even-numbered portion of memory means, and digital signals corresponding to odd-numbered fields into an odd-numbered portion of said memory means in synchronization with said video signal;
- alternately reading in said odd-numbered portion of said memory means digital signals corresponding to a line of an odd-numbered field, and in the even-numbered portion of said memory means, digital signals corresponding to a line of an even-numbered field, in synchronization with a signal representative of an image that is to be reconstituted for a display matrix;
- reconstituting an image for said display matrix from the signals thus read.

In a preferred embodiment, said steps consisting respectively of reading and writing are carried out simultaneously in, respectively, both said even-numbered and odd-numbered portions of said memory means.

The invention also provides a device for implementing the above method comprising:

- a video analog-digital convertor designed to receive said video image for transformation and to supply digital signals at it output corresponding to even-numbered and odd-numbered fields as well as composite field and line synchronization signals;
- an image storage memory having at least an even-numbered portion and at least an odd-numbered portion, accessible for asynchronous read and write operations;
- a graphics controller managing writing of the signals supplied by said convertor into said memory, and reading of said memory, and supplying at its output a signal for said display matrix.

In a preferred embodiment, said memory comprises four portions corresponding respectively to the upper portion of even-numbered fields of said video signal, the upper portion of odd-numbered fields of said video signal, the lower portion of even-numbered fields of said video signal and the lower portion of said odd-numbered field of said video signal.

The graphics controller comprises:

- a video synchronization module for detecting a useful window of said video signal;
- a write module providing write synchronization in the portions of said memory for digital signals supplied by said analog-digital convertor;
- a read module providing read synchronization in said memory and generation of a signal for said display matrix;
- a processing module transforming signals read in said memory into a signal for said display matrix.

According to a preferred embodiment, said processing module comprises a gray scale palette module for transforming the values of signals read in said memory into gray scale levels, and an interface module for putting signals received from said gray scale palette module into serial form for constituting a signal for said display matrix.

In an advantageous embodiment, the device further comprises an image inset memory designed to receive an image to be inset into said display matrix image, and said graphics controller further managing reading of said image inset memory and supplying at the output thereof a signal for said display matrix into which said image to be inset is incorporated.

In this case, the graphics controller comprises:

- a video synchronization module for detecting a useful window of said video signal;
- a write module providing write synchronization in the portions of said memory for digital signals supplied by said analog-digital convertor;
- a read module providing read synchronization in said memory and generation of a signal for said display matrix;
- an image inset memory management module and an address generation module allowing reading or writing in said image inset memory;
- a module for multiplexing the signals read in said memory and in said image inset memory;
- a processing module for transforming signals originating from said multiplexing module into a signal for said display matrix.

In this case, the processing module preferably comprises a gray scale palette module for transforming the values of signals read in said memory into gray scale levels, and an interface module for putting signals received from said gray scale palette module into serial form for constituting a signal for said display matrix.

The invention finally provides a lens centering apparatus comprising:

- a unit supplying a video image of the lens to be centered;
- a spectacle frame reading unit comprising a microprocessor generating an image of a spectacle frame and of an alignment pattern to be inset into said image;
- a display device consisting of a display matrix.

BRIEF DESCRIPTION OF THE DRAWINGS

The features and advantages of the present invention will be better understood from the description that follows provided by way of example and with reference to the attached drawing.

DETAILED DESCRIPTION OF PREFERRED EMBODIMENTS

Figure 1:
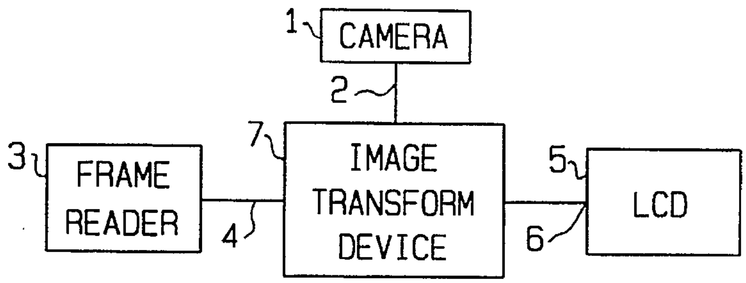
FIG. 1 is a schematic block diagram of one application of the invention to a device for centering glass objects.

FIG. 1 is a schematic block diagram of an application of the invention to a device for centering glass objects. The centering device of FIG. 1 comprises a first unit 1 supplying a CCIR or EIA (Electronic Industries Association)-format video image of the glass object for processing. Typically, unit 1 comprises a holder carrying the glass object to be processed, a device for illuminating the object and a CCD camera filming the glass object. Unit 1 supplies a video image of the glass object at its output 2.

The device in FIG. 1 further comprises a unit 3 for reading a spectacle frame, in other words a unit outputting an image of a given frame. Apparatus of this type is known in the prior art. Unit 3 further comprises a microprocessor able to generate a pattern for alignment purposes. Unit 3 supplies signals representative of the frame and the pattern at its output 4, for superimposition on the image of the glass object supplied by unit 1. The structure of these signals is described in more detail below.

The device in FIG. 1 also comprises an LCD display 5 for displaying an image of the glass object, the frame and the pattern. As explained above, the use of LCD panel 5 makes it possible to avoid the disadvantages of bulk, instability over time and parallax of known devices. LCD display device 5 has an input which is diagrammatically indicated by reference numeral 6, for receiving the image to be displayed.

Finally, the device in FIG. 1 comprises a device for image transformation 7, implementing the method of the invention and of which the structure and operation are described in more detail with reference to FIGS. 5 and 6. Image transformation device 7 generates an image for the LCD type display, in which images of the glass object to be processed, of the spectacle frame and of the pattern are superimposed. This image is transmitted for display to the input 6 of LCD display device 5.

The device in FIG. 1 enables an image of the glass object, of a spectacle frame and the pattern to be displayed on an LCD display, and has the advantages described above.

Figure 2:
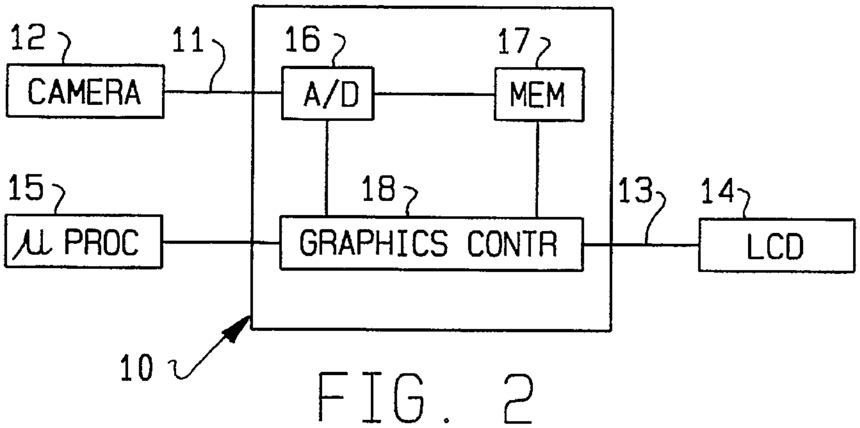
FIG. 2 is a block diagram of a first embodiment of a device for carrying out the method according to the invention.

FIG. 2 is a block diagram of a first embodiment of a device 10 for carrying out the method according to the invention. The device in FIG. 2 enables a video image to be transformed into an image for a display matrix. Device 10 has an input 11 designed to receive a video signal. On FIG. 2, a video camera 12 supplying this signal is shown diagrammatically. Device 10 has an output 13 supplying an image signal suitable for an LCD display; an LCD display device 14 is also shown diagrammatically in FIG. 2. Device 10 is controlled by a microprocessor 15.

Device 10 comprises a video analog-digital converter 16 connected to the input of device 10 for receiving a video image signal. Convertor 16 may for example be the BT 252 Brooktree type component, with the following functionalities:

- 8-bit flash conversion;
- video signal field and line synchronization detection;
- a 256×8 bit RAM memory used as a linearity correction table for the video signal and able to be addressed by microprocessor 15;
- conversion gain and DC offset programmable by microprocessor 15.

Device 10 includes a memory 17 for storing an image consisting of a dual-port RAM memory, for example a Texas Instruments TMS 4C 1050 device accessible in asynchronous write and read modes. The memory is for example realised with the aid of a pseudo-static FIFO-type RAM, with asynchronous read-write operation, divided into two portions, an odd-numbered and an even-numbered portion.

Each one of the even-numbered and odd-numbered portions can be separated into an upper and a lower portion.

Device 10 includes a graphics controller 18 linked to microprocessor 15. Graphics controller 18 is also connected to the convertor 16 and to memory 17. Memory 17 is write-addressed by the output from video analog-digital convertor 16 under the control of graphics controller 18. Read/write addressing of memory 17 is performed by microprocessor 15 via the graphics controller 18. Graphics controller 18 is connected to the output 13 of device 10, and supplies a LCD image signal. Graphics controller 18 may be implemented in the form of a PLD (programmable logic device) circuit, and its various functionalities are described more precisely with reference to FIG. 3.

Operation of the device in FIG. 2 is as follows: in the convertor 16, the video signal received from camera 12 is processed in a manner suitable for separating useful data from field and line synchronization data. The term "useful data" should taken to mean data that corresponds to gray scale levels of the pixels of each one of the lines of even-numbered and odd-numbered fields. The useful data is digitized in convertor 16. At the output from the convertor, the useful data from the even-numbered and odd-numbered fields are available in digital form in synchronization with the input video signal.

The useful data are written into memory 17 into the corresponding even-numbered and odd-numbered portion thereof. In other words, when useful digital data for the even-numbered field is obtained at the output of convertor 16, these are written to the even-numbered portion of memory 17, and when odd-numbered field digital data is obtained from convertor 16, these are written into the odd-numbered portion of memory 17. Writing is carried out in synchronization with the video signal.

At the same time, the data written into the even-numbered and odd-numbered portions of memory 17 are read out, this time not in synchronization with the video signal but at a frequency which is compatible with that of the graphics controller 18 driving LCD display 14. The data thus read is used by the graphics controller for display on the graphics screen.

Figure 3:
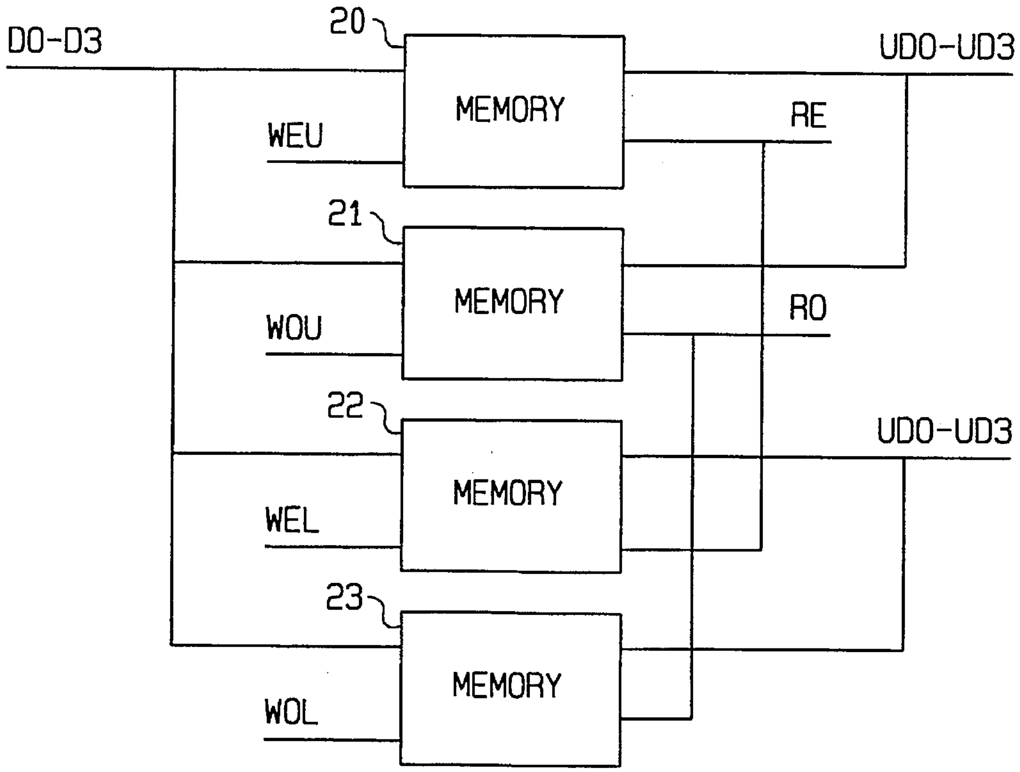
FIG. 3 is a block diagram of an embodiment of the memory used for storage in the device of FIG. 2.
Figure 4:
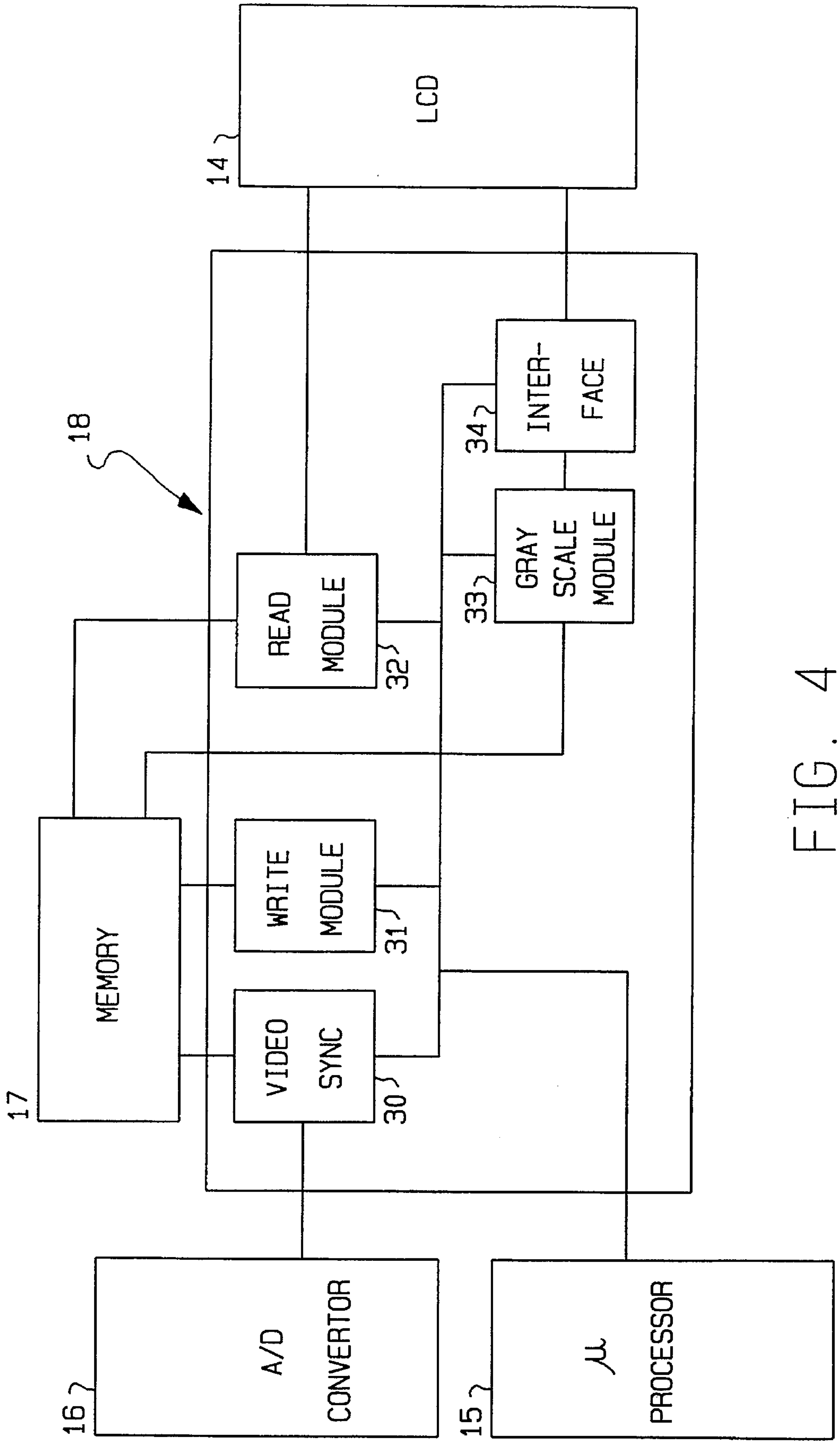
FIG. 4 is a block diagram of one embodiment of a graphics controller of the device in FIG. 2.

The read and write operations in memory 17 are asynchronous and are controlled by the graphics controller 18 as will become more clear from the description with reference to FIGS. 3 and 4.

FIG. 3 is a block diagram of one embodiment of memory 17 for performing storage in the device 10 of FIG. 2. Memory 17 is divided up into four memory planes 20, 21, 22, 23 respectively corresponding to the upper portion of the even-numbered field of the video signal, the upper portion of the odd-numbered field of the video signal, the lower portion of the even-numbered field of the video signal, and the lower portion of the odd-numbered field of the video signal.

During writing, these four memory planes receive at their input on four bits D0 to D3, useful signals corresponding to even- and odd-numbered fields originating from convertor 16. Four write select signals WEU, WOU, WEL and WOL make it possible to respectively select into which of the memory planes 20, 21, 22, 23 the signals DO to D3 should be written.

In read mode, the two upper memory planes 20 and 21 supply, on four bits UD0 to UD3, the useful data intended for the graphics controller. Similarly, the two lower memory planes 22 and 23 supply, on four bits LD0 to LD3, the useful data for the graphics controller. Two signals RE and RO allow readout to be selected from among memory planes 20, 22 for the even-numbered field and from memory plane 21, 23 for the odd-numbered field.

As explained with reference to FIG. 2, memory 17 is written and read in an asynchronous manner, the graphics controller issuing signals WEU, WOU, WEL, WOL, RE and RO allowing reading and writing to be controlled in the various memory planes. Dividing memory 17 up by even-numbered and odd-numbered fields only requires writing to be done, at any given moment, into one of the memory planes 20, 22 or 21, 23. The fact of separating memory 17 up into upper and lower portions of the image enables the constitution of the signals intended for the LCD display to be simplified, the latter being separated into an upper and a lower portion.

FIG. 4 is a block diagram of one embodiment of the graphics controller 18 of the device in FIG. 2. The various modules of the graphics controller 18 are shown diagrammatically. On FIG. 4 there can be seen convertor 16, microprocessor 15, display device 14 and the memory 17. Graphics controller 18 includes a source, not shown, for generating a clock signal.

Graphics controller 18 comprises a video synchronization module 30 enabling a useful window of the video signal to be detected, in other words the time window where the useful video signal information can be found. The video synchronization module 30 receives a field and line synch signal from converter 16. It also receives a clock signal from the source in controller 18. Video synchronization module 30 issues a synch signal at its output as well as a clock signal governing writing into memory 17.

Graphics controller 18 comprises a module 31 for writing into memory 17. This write module 31 is responsible for generating signals WEU, WOU, WEL, WOL for writing into memory 17, in synchronization with the video signal received. Write module 31 receives a signal from convertor 16 representative of the presence of the useful video signal as well as a clock signal supplied by an external oscillator which is not shown. Write module 31 also receives the synchronization signal and a clock signal governing writing into memory 17, supplied by video synch module 30. On the basis of the information that it receives, write module 31 generates write signals WEU, WOU, WEL, WOL for the memory 17. It also generates a write reset signal for memory 17, as well as a write clock signal.

Video synchronization module 30 and write synchronization module 31 also make it possible to control writing of memory 17 from the graphics controller 18, in synchronization with the received video signal.

Graphics controller 18 comprises a read module 32. The read module 32 synchronizes memory 17 readout and generates signals for the LCD display 14. Read module 32 receives a clock signal from graphics controller 18. It sends read signals RE and RO directed to memory planes 20, 22, for the even-numbered field, or directed to memory planes 21, 23 for the odd-numbered field, to memory 17. Read module 32 is connected to the LCD display 14 and supplies write control signals to the LCD display, specifically write start, scan start and scanning clock signals.

Graphics controller 18 comprises a gray scale palette module 33 enabling the signals read in memory 17 to be transformed into various gray levels for the LCD display 14. The gray scale palette module 33 has an upper portion and a lower portion. The upper portion of gray scale palette module 33 receives signals UD0 to UD3 originating from the two upper memory planes 20 and 21 of memory 17, whereas the lower portion of gray scale palette module 33 receives the signals LD0 to LD3 originating from the two lower memory planes 22 and 23 of memory 17; the upper and lower portions of module 33 further receive an algorithm selection signal from read module 32. As a function of this signal, selection is made of an appropriate signal processing algorithm originating from the video memory. This algorithm may for example be the one described in French Patent Application No. 2,671,656. The upper and lower portions of module 33 supply the useful signals at differing levels of gray at their output.

The signals issued by the gray scale palette module 33 are sent to a module interface 34. This module interface 34 transforms the signals it receives into signals suitable for the LCD display. Like module 33, module 34 is divided up into an upper and a lower portion. The upper portion or, respectively, lower portion, receives the signals originating from the upper and, respectively lower portion of module 33, puts them in serial form and sends them to the upper or, respectively, lower portion of LCD display 14 in the form of a suitable signal. Module 34 is synchronised by a signal received from read module 32.

The various modules of controller 18 enable the method of the invention to be implemented. Memory 17 is written thanks to the presence of video synchronization module 30 and write synchronization module 31; read module 32 controls readout of memory 17. The signals read in memory 17 are processed in the gray scale palette module 33 and the interface module 34 for adaptation to the LCD display 14. The LCD display 14 is written thanks to the presence of control signals issued by read module 32, and the data signals issued by interface module 34.

The gain and DC offset of convertor 16 are controlled by microprocessor 15.

Figure 5:
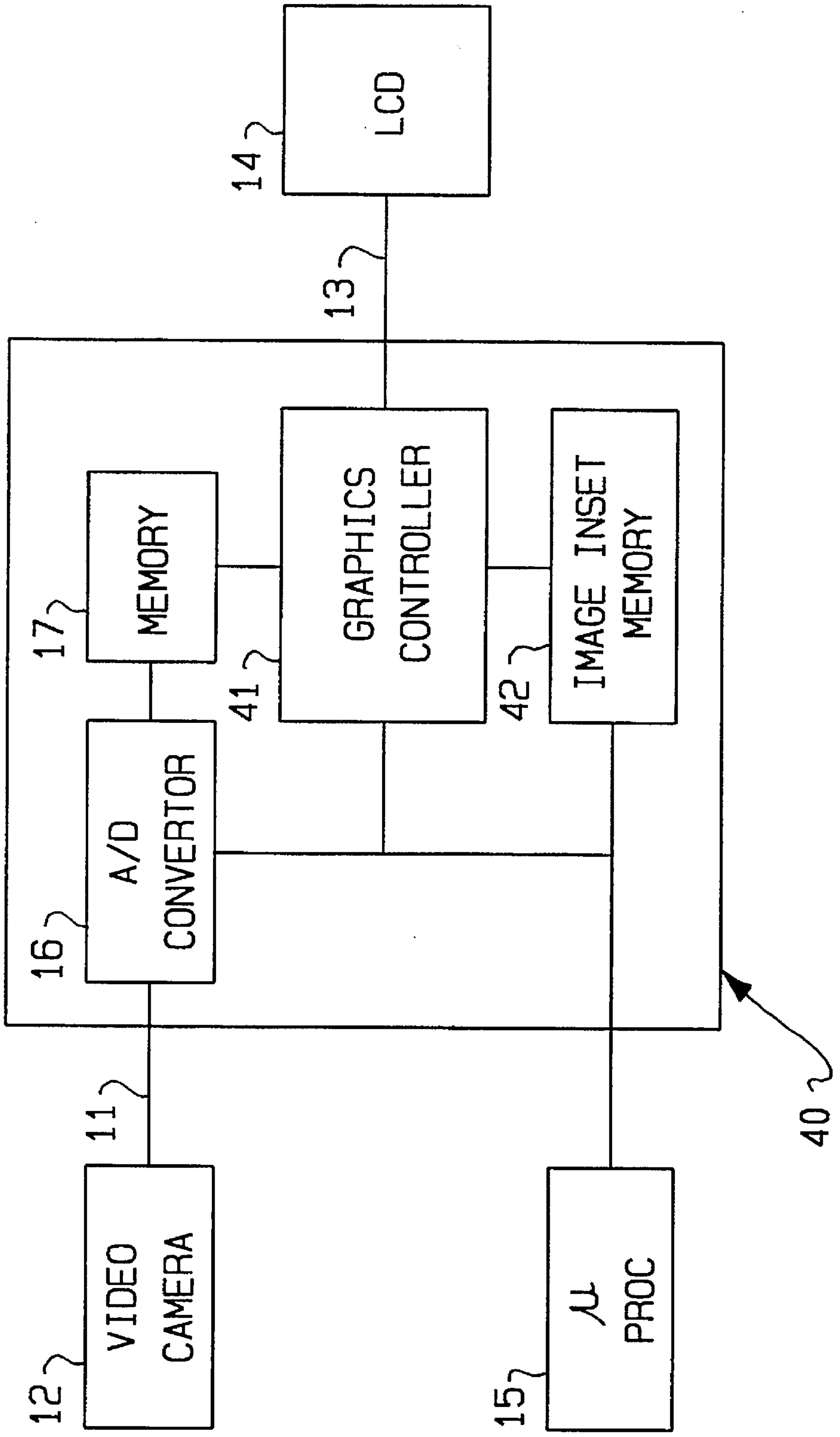
FIG. 5 is a block diagram of a second embodiment of a device for carrying out the method of the invention.

FIG. 5 is a block diagram of a second embodiment of a device 40 for carrying out the method of the invention. The device in FIGS. 5 makes is possible to transform a video image into an image for a display matrix. It includes the supplementary feature of being able to add a further image to the LCD display which, in an application such as the one described with reference to FIG. 1, comprises a pattern and the shape of the spectacle frame into which the glass lens is to be mounted. Obviously, the supplementary image is not limited to this example of its use.

Those portions of the device in FIG. 5 that are similar to those of the device in FIG. 2 carry the same reference numerals and will not be described again in detail.

Device 40 comprises, like the device 10 in FIG. 2, a video analog-digital convertor 16, a memory 17 (see FIG. 3), and a graphics controller 41. Device 40 further comprises an image inset memory 42 linked firstly to microprocessor 15 and, secondly, to graphics controller 41.

The device in FIG. 5 operates like the one in FIG. 2 as regards the transformation of the video image supplied at input 11. Additionally, microprocessor 15 stores an image to be added to the LCD display in the image inset memory 42. This image is transmitted to the LCD display 14 by the graphics controller 41, summing it with the transformed video image, to allow its inclusion.

Image inset memory 42 is advantageously divided up into an upper and a lower portion like memory 17. It can be implemented using a dual-port dynamic RAM memory, for example a Toshiba type TC 524256, which can be accessed by the microprocessor via graphics controller 41. The size of memory 42 is typically 480×640×4 bits for a standard LCD display.

Figure 6:
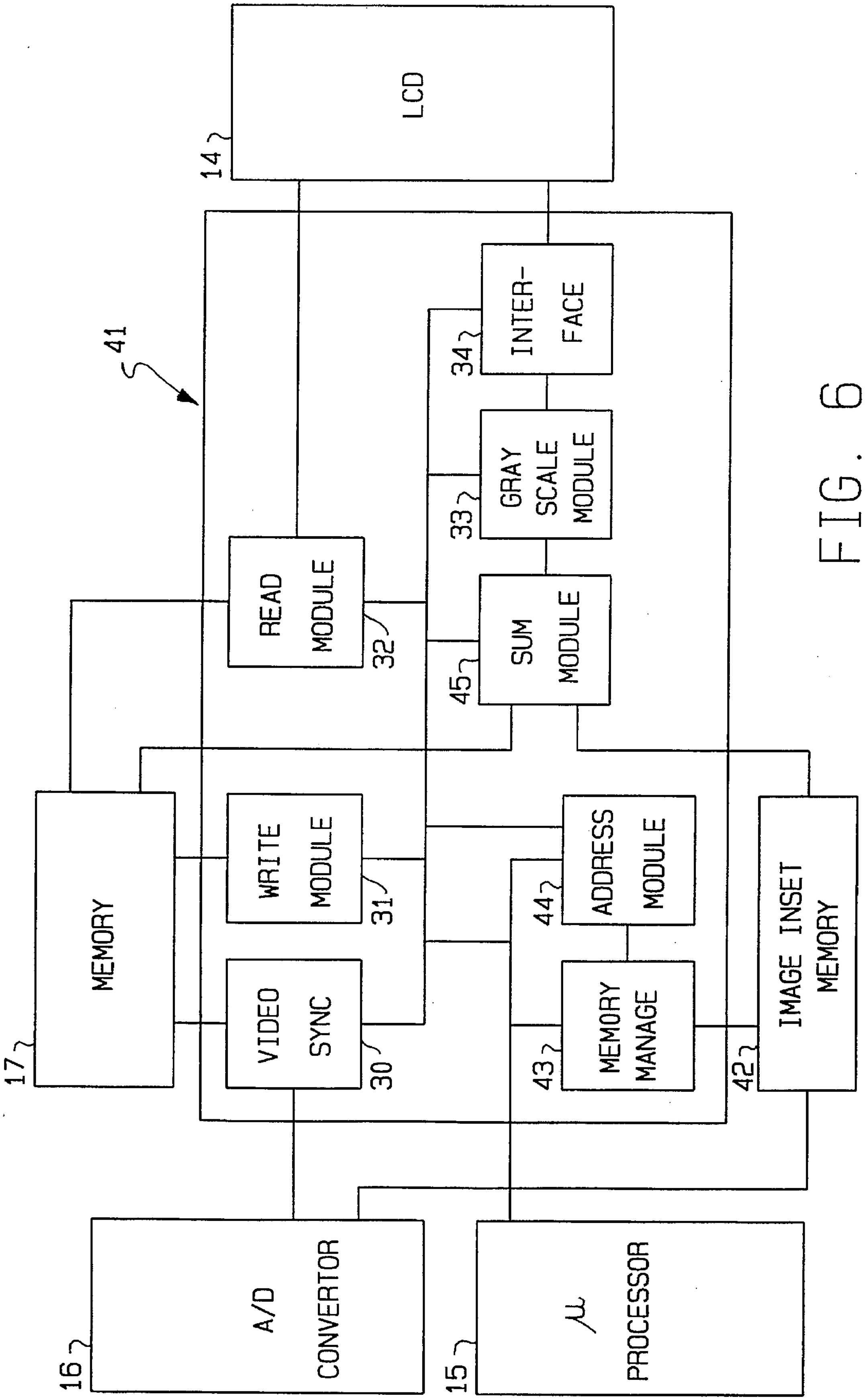
FIG. 6 is a block diagram of an embodiment of the graphics controller of the device in FIG. 5

The operation of the device in FIG. 5 will become perfectly clear from the description accompanying FIG. 6.

FIG. 6 is a block diagram of one embodiment of graphics controller 41 of the device in FIG. 5. Those modules of the graphics controller that are identical to those of the graphics controller in FIG. 4 are identified by the same reference numerals and will not be described again in detail. Like the graphics controller 18 of FIG. 4, the graphics controller 41 of FIG. 6 can be implemented by a PLD (programmable logic device) circuit.

The graphics controller further includes an image inset memory management module 43 for image inset memory 42, a module 44 for generating image inset memory addresses and a summing module 45.

Image inset memory management module 43 for image inset memory 42 supplies those signals needed to control writing of the additional image by the microprocessor, together with refresh signals for memory 42. Module 43 receives a write or read select signal for memory 42 from microprocessor 15. It also receives a read or write cycle start signal, a read or write cycle synchronization signal, as well as an acknowledgement signal for the read and write cycles.

Module 43 further receives a synchronization signal from read module 32 for transferring data from the image inset memory 42 to the graphics controller. Module 43 also sends upper or lower portion row address select, column address select, read enable and transfer enable signals to image inset memory 42.

Module 43 receives signals for selecting the upper or lower portion of memory 42 from image inset memory address generation module 44, and supplies data transfer synchronization signals and line synchronization signals to module 44.

Module 44 for image inset memory address generation carries out generation of image inset memory 42 addresses in read and write mode. For writing memory 42, module 44 receives read or write addresses on 11 bits from microprocessor 15. As a function of this address, it supplies module 43 with row address selection signals, column address selection signals for the upper or lower portion of memory 42. It then sends an address multiplexed on 9 bits to image inset memory 42. Furthermore, module 44 receives write enable and transfer enable signals from module 43.

When reading memory 42, module 44 receives a read address from read module 32. As a function of this address, it sends row and column address selection signals for the upper and lower portions of memory 42 to the module 43. It also sends a read address to the image inset memory 42.

Image inset memory 42 is linked to the controller 41, receiving, firstly, command signals issued by module 43 and, secondly, address signals issued by module 44. Memory 42 is a dual-port RAM memory; one of the ports receives four bits of the signals originating from microprocessor 15 (if appropriate via the controller); the other port is linked to the summing module 45 of controller 41.

Modules 43 and 44 thus enable the inset image to be written by the microprocessor into memory 42. They also enable the inset image to be read out from memory 42 under the control of read module 32.

The signals read by graphics controller 41 in the image inset memory 42 are transmitted to the summing module 45. This summing module 45 is arranged ahead of gray scale palette module 33. It receives signals originating from memory 17 and signals originating from image inset memory 42. It performs summation on a time basis of the signals it receives, transmitting the result to the gray scale palette module 33.

The device in FIG. 6 enables an image corresponding to the video image from camera 12 to be displayed on the LCD display 14 with an additional image supplied by microprocessor 15. It is particularly suitable for carrying out the invention described with reference to FIG. 1.

The various practical details of the various modules of the graphics controller 18 and 41 are within the scope of the man skilled in the art who may chose to use circuits other than the PLD circuits proposed above.

What is claimed is:

1. A lens centering apparatus comprising:

a unit supplying a video image of a lens to be centered;

a spectacle frame reading unit comprising a microprocessor generating an image of a spectacle frame and of an alignment pattern to be inset into said video image of the lens;

a display device which includes a display matrix;

a video analog-digital convertor designed to receive the video image of the lens and to supply digital signals at its output corresponding to even-numbered and odd-numbered fields and composite field and line synchronization signals;

an image storage memory having at least an even-numbered portion and at least an odd-numbered portion, accessible for asynchronous read and write operations;

a graphics controller managing writing of the digital signals supplied by said convertor into said image storage memory, and reading of said image storage memory, and supplying at its output a signal for said display matrix; and an inset memory designed to receive said image to be inset, and said graphics controller further managing reading of said image inset memory and incorporating into said signal for said display matrix said image to be inset.

2. The lens centering apparatus of claim 1, wherein said image storage memory comprises four portions corresponding respectively to an upper portion of even-numbered fields of said video image of the lens, an upper portion of odd-numbered fields of said video image of the lens, a lower portion of even-numbered fields of said video image of the lens and a lower portion of said odd-numbered field of said video image of the lens.

3. The lens centering apparatus of claim 2, wherein said graphics controller comprises:

a video synchronization module for detecting a useful window of said video image of the lens a write module providing write synchronization in the portions of said image storage memory for digital signals supplied by said analog-digital convertor;

a read module providing read synchronization in said image storage memory for supplying said signal for said display matrix; and a processing module for transforming signals read in said image storage memory into a signal for said display matrix.

4. The lens centering apparatus of claim 3, wherein said processing module comprises a gray scale palette module for transforming the values of said signals read in said image storage memory into gray scale levels, and an interface module for putting transformed signals received from said gray scale palette module into serial form for constituting said signal for said display matrix.

5. The lens centering apparatus of claim 1, wherein said graphics controller comprises:

a video synchronization module for detecting a useful window of said video signal;

a write module providing write synchronization in the portions of said image storage memory for digital signals supplied by said analog-digital convertor;

a read module providing read synchronization in said image storage memory for supplying said signal for said display matrix;

an inset memory management module and an address generation module allowing reading or writing in said image inset memory;

a module for summing the signals read in said image storage memory and in said image inset memory; and a processing module for transforming signals originating from said summing module into a signal for said display matrix.

6. The lens centering apparatus device of claim 5, wherein said processing module comprises a gray scale palette module for transforming the values of said signals read in said image storage memory into gray scale levels, and an interface module for putting transformed signals received from said gray scale palette module into serial form for constituting said signal for said display matrix.

* * * * *